(12) United States Patent
Whatmough et al.

(10) Patent No.: US 10,747,845 B2
(45) Date of Patent: Aug. 18, 2020

(54) SYSTEM, METHOD AND APPARATUS FOR COMPUTATIONALLY EFFICIENT DATA MANIPULATION

(71) Applicant: Arm Limited, Cambridge (GB)

(72) Inventors: Paul Nicholas Whatmough, Cambridge, MA (US); Matthew Mattina, Boylston, MA (US); Zhigang Liu, Westford, MA (US)

(73) Assignee: Arm Limited, Cambridge (GB)

( * ) Notice: Subject to any disclaimer, the term of this patent is extended or adjusted under 35 U.S.C. 154(b) by 48 days.

(21) Appl. No.: 16/118,818

(22) Filed: Aug. 31, 2018

(65) Prior Publication Data
US 2020/0073911 A1 Mar. 5, 2020

(51) Int. Cl.
*G06F 17/16* (2006.01)
*G06F 7/523* (2006.01)
*G06N 3/04* (2006.01)
*G06N 3/08* (2006.01)

(52) U.S. Cl.
CPC .............. *G06F 17/16* (2013.01); *G06F 7/523* (2013.01); *G06N 3/04* (2013.01); *G06N 3/08* (2013.01)

(58) Field of Classification Search
None
See application file for complete search history.

(56) References Cited

U.S. PATENT DOCUMENTS

2016/0364835 A1* 12/2016 Srebnik .............. G06F 12/0842

2018/0046906 A1* 2/2018 Dally .................. G06F 7/523
2019/0050717 A1* 2/2019 Temam .................. G06F 13/00

FOREIGN PATENT DOCUMENTS

WO 9614616 A1 5/1996

OTHER PUBLICATIONS

Pete Warden, "Why GEMM is at the Heart of Deep Learning," https://petewarden.com/2015/04/20/why-gemm-is-at-the-heart-of-deep-learning/ , Apr. 20, 2015.
Y. H. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379.
Jouppi et al., "In-Datacenter Performance Analysis of a Tensor Processing Unit," 44th International Symposium on Computer Architecture (ISCA), Toronto, Canada, Jun. 24-28, 2017.
B. Moons and M. Verhelst, "A 0.3-2.6 TOPS/W precision-scalable processor for real-time large-scale ConvNets," 2016 IEEE Symposium on VLSI Circuits (VLSI-Circuits), Honolulu, HI, 2016, pp. 1-2.
Parashar et al., "SCNN: An Accelerator for Compressed-sparse Convolutional Neural Networks," ISCA '17 Proceedings of the 44th Annual International Symposium on Computer Architecture, Toronto, ON, Canada—Jun. 24-28, 2017, pp. 27-40.
Yosinski et al., "How transferable are features in deep neural networks?," Advances in Neural Information Processing Systems 27, pp. 3320-3328. Dec. 2014.

(Continued)

*Primary Examiner* — Michael D. Yaary
(74) *Attorney, Agent, or Firm* — Leveque IP Law, P.C.

(57) ABSTRACT

A system, apparatus and method for exposing input data operands and input weight operands to elements of a two-dimensional array so that two pairs of operands are exposed to each element of the array.

26 Claims, 6 Drawing Sheets

(56) References Cited

OTHER PUBLICATIONS

Dongyoung Kim, Junwhan Ahn, and Sungjoo Yoo. 2017. A novel zero weight/activation-aware hardware architecture of convolutional neural network. In Proceedings of the Conference on Design, Automation & Test in Europe (DATE 17). European Design and Automation Association, 3001 Leuven, Belgium, Belgium, 1466-1471.

Jason Yosinski, Jeff Clune, Yoshua Bengio, and Hod Lipson. 2014. How transferable are features in deep neural networks?. In Proceedings of the 27th International Conference on Neural Information Processing Systems—vol. 2 (NIPS'14), Z. Ghahramani, M. Welling, C. Cortes, N. D. Lawrence, and K. Q. Weinberger (Eds.), vol. 2. MIT Press, Cambridge, MA, USA, 3320-3328.

Sarwar, Syed & Ankit, Aayush & Roy, Kaushik. (2017). Incremental Learning in Deep Convolutional Neural Networks Using Partial Network Sharing. https://www.researchgate.net/publication/321666023_Incremental_Learning_in_Deep_Convolutional_Neural_Networks_Using_Partial_Network_Sharing.

\* cited by examiner

SYSTEM, METHOD AND APPARATUS FOR COMPUTATIONALLY EFFICIENT DATA MANIPULATION

BACKGROUND

Machine learning technology is continually evolving and has come to support many aspects of modern society. One of the most useful applications of machine learning is image classification. Image classification can be achieved by using a neural network to efficiently manipulate a large quantity of data. Other uses of machine learning include web searches, content filtering, automated recommendations on merchant websites, automated game playing, object detection, speech recognition, machine translations, and drug discoveries.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
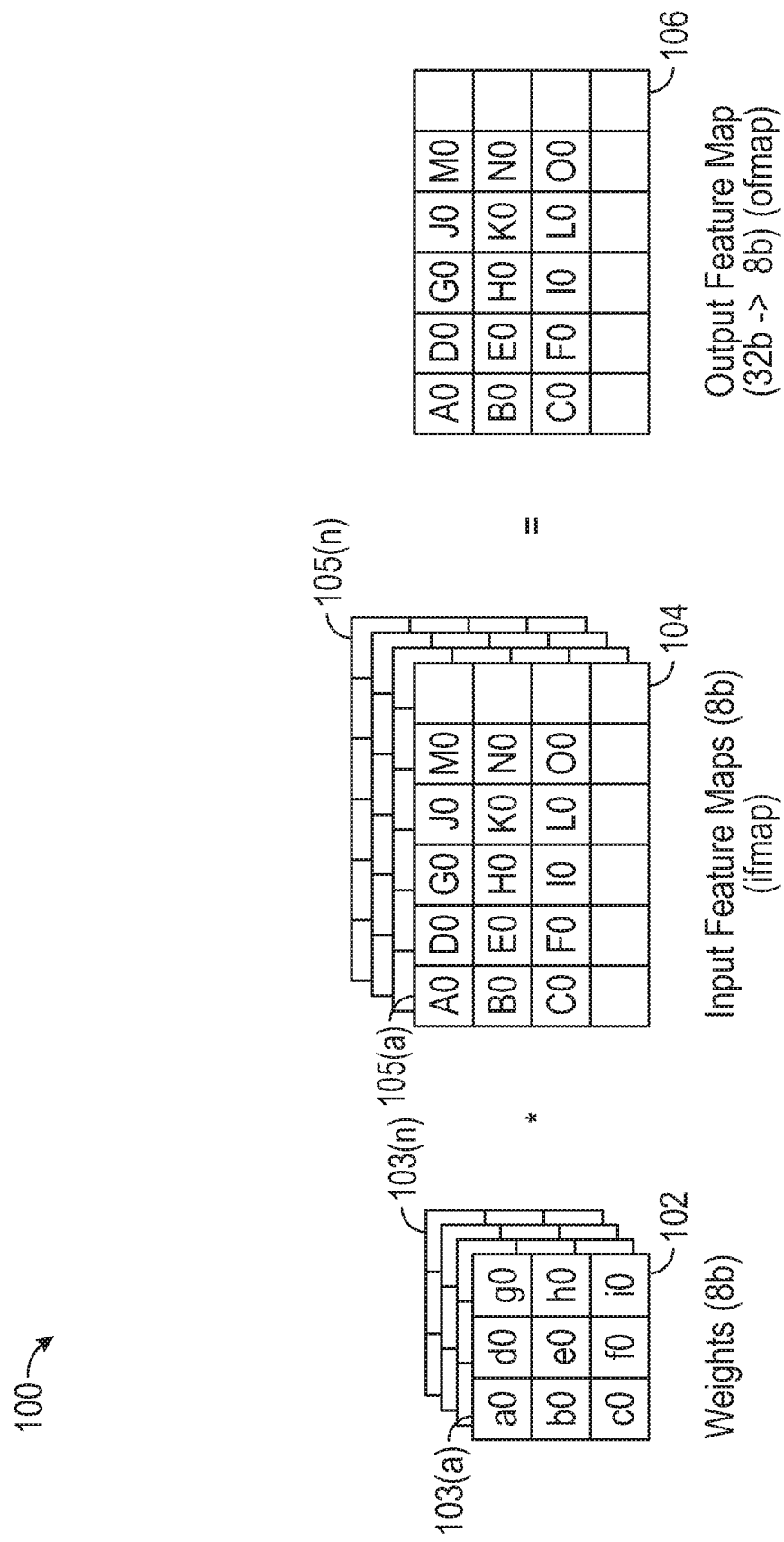
FIG. 1 illustrates calculation of a single output feature map of a convolutional neural network (CNN) layer.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software, or a combination of hardware and software. In a module that includes software, the software may contain one or more routines, or subroutines. One or more modules can make up a program and/or device.

Neural networks (NNs) are typically used to map or classify a set of input patterns to a set of output patterns. Systems based on neural networks have evolved as a popular machine learning basis, and have been successfully employed in a wide variety of domains for practical applications.

In order to classify the input patterns, or input data, with adequate correctness, the neural networks first need to do undergo a learning exercise, which is called the training phase. During the training phase, paired training samples, for example depicted as (x, y), of an input x and a corresponding output or label y, are provided to the neural network, which then learns or establishes how to associate or map the given input x with the correct output y.

Neural networks and related systems can be represented as distributed processing elements that implement summation, multiplication, exponentiation or other functions on the elements incoming messages/signals. Such networks can be enabled and implemented through a variety of implementations.

For example, a system may be implemented as a network of electronically coupled functional node components. The functional node components can be logical gates arranged or configured in a processor to perform a specified function. As a second example, the system may be implemented as a network model programmed or configured to be operative on a processor.

The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

While neural networks have desired features, convolutional neural networks (CNNs) may be considered a lessthan completely connected neural network (each neuron is connected to only a few neurons in the previous layer) and neurons share weights.

The convolutional neural network (CNN) is a subclass of neural-networks, which have at least one convolution layer. CNNs are typically used for capturing local information (e.g., neighboring pixels in an image or surrounding words in a text) as well as reducing the complexity of the model (faster training, needs fewer samples, reduces the chance of overfitting).

Convolutional neural networks (CNN), are feed-forward neural networks that comprise layers that are not fully connected. In CNNs, neurons in a convolutional layer are connected to neurons in a subset, or neighborhood, of an earlier layer. This enables, in at least some CNNs, retaining spatial features in the input.

Thus, convolutional neural networks (CNNs) may comprise a set of layers, the first layer being an input layer configured to receive an input. The input layer includes neurons that are connected to neurons in a second layer, which may be referred to as a hidden layer. Neurons of the hidden layer may be connected to a further hidden layer, or an output layer.

CNNs have repetitive blocks of neurons that are applied across space (for images) or time (for audio signals etc.). For images, these blocks of neurons can be interpreted as two-dimensional (2D) convolutional kernels, repeatedly applied over each patch of the image. For speech, they can be seen as the one-dimensional (1D) convolutional kernels applied across time-windows. At training time, the weights for these repeated blocks are "shared", i.e., the weight gradients learned over various image patches are averaged.

In particular, convolutional neural networks (CNNs) may be useful for performing inference on data for which feature recognition is independent of one or more dimensions of the data; for instance, when detecting shapes in an image, the detected shapes are not dependent on their position in the image—the same features used to detect a square in one part of the image may be used to detect a square in another part of the image as well. These dimensions may be spatial (as in the 2D image example), but may additionally or alternatively be temporal or any suitable dimensions (e.g., a frequency dimension for audio or multispectral light data).

In accordance with several embodiments, the processes may be performed by a "cloud" server system. In still further embodiments, the processes may be performed on a user device.

The embodiments described herein apply to any network layer, including CNN, FC or other layer in a network, either partially, or fully.

Convolutional neural networks (CNNs) are typically processed by converting the multi-dimensional convolution operations into generic matrix multiplication (GEMM), by means of a simple transform, for example an image to column (IM2COL).

Convolutional neural networks (CNNs) are currently very popular for implementing tasks such as image classification. CNNs are challenging to implement in constrained devices, as they require a very large number of MAC operations, which operate on very large data structures.

The MAC (multiply-accumulate) operations are used in computing operations, especially DSP (digital signal processing). The MAC operation is a common operation that computes the product of two numbers and adds that product to an accumulator. The hardware unit that performs the operation is known as a multiplier-accumulator (MAC, or MAC unit, or MAC module); the operation itself is also often called a MAC or a MAC operation.

Convolutional neural network algorithms (CNNs) can be considered a cascaded set of pattern recognition filters that need to be trained. A CNN consists of a series of layers, which include convolutional layers, non-linear scalar operator layers, and layers that downsample intermediate data. Convolutional layers typically represent the core of the CNN computation and are characterized by a set of filters that are usually 1×1 or 3×3, and occasionally 5×5 or larger. The values of these filters are the weights that are learned using a training set for the network.

Convolutional neural networks (CNNs) operate on sparse data. This disclosure describes an approach that extends a systolic array architecture to remove the compute and data movement associated with zero operands. This results in higher throughput and/or lower power, without significant additional hardware.

A CNN layer calculation is illustrated in FIG. 1 for a 3×3 filter size. While a CNN layer calculation is shown, any suitable neural network structure may be used. The description of the CNN layer embodiment is merely one embodiment.

As shown in FIG. 1, system 100 includes weights 102, which include weights for each layer 103(a) . . . (n), where "n" is any suitable number. The weights 102 may be established, or fixed, for each layer 103(a) . . . (n) or a combination of established, or fixed, and programmable weights for the various layers 103.

Input feature map (IFM) 104 has a plurality of layers 105(a) . . . (n), where "n" is any suitable number.

The output feature map 106 is generated by logically multiplying, or other suitable operation, the weights 102 and the input feature map (IFM) 104. The operation, shown as multiplying, utilizes the various layers 103 (of weights 102) and 105 (of IFM 104), respectively. While FIG. 1 illustrates an example of a 3×3 filter, any suitable structure could be used.

A common approach to implement convolution in a CPU (central processing unit), a GPU (graphics processing unit) and dedicated hardware accelerators is to convert it into a generic matrix multiplication (GEMM) operation.

The GEMM may be used for the convolutional layers since the convolutional layer treats its input as a two dimensional image, with a number of channels for each pixel, much like a classical image with width, height, and depth.

In software, the GEMM operation can be performed by calling a library function. In hardware, the GEMM operation can be implemented efficiently as a 2D MAC array. One consideration of this "systolic" approach is that there is a large amount of "reuse" operands, once they enter the 2D array. For example, the Google® TPU and MIT Eyeriss® chips are two examples of dedicated hardware accelerators for CNNs for this type of architecture.

Figure 2:
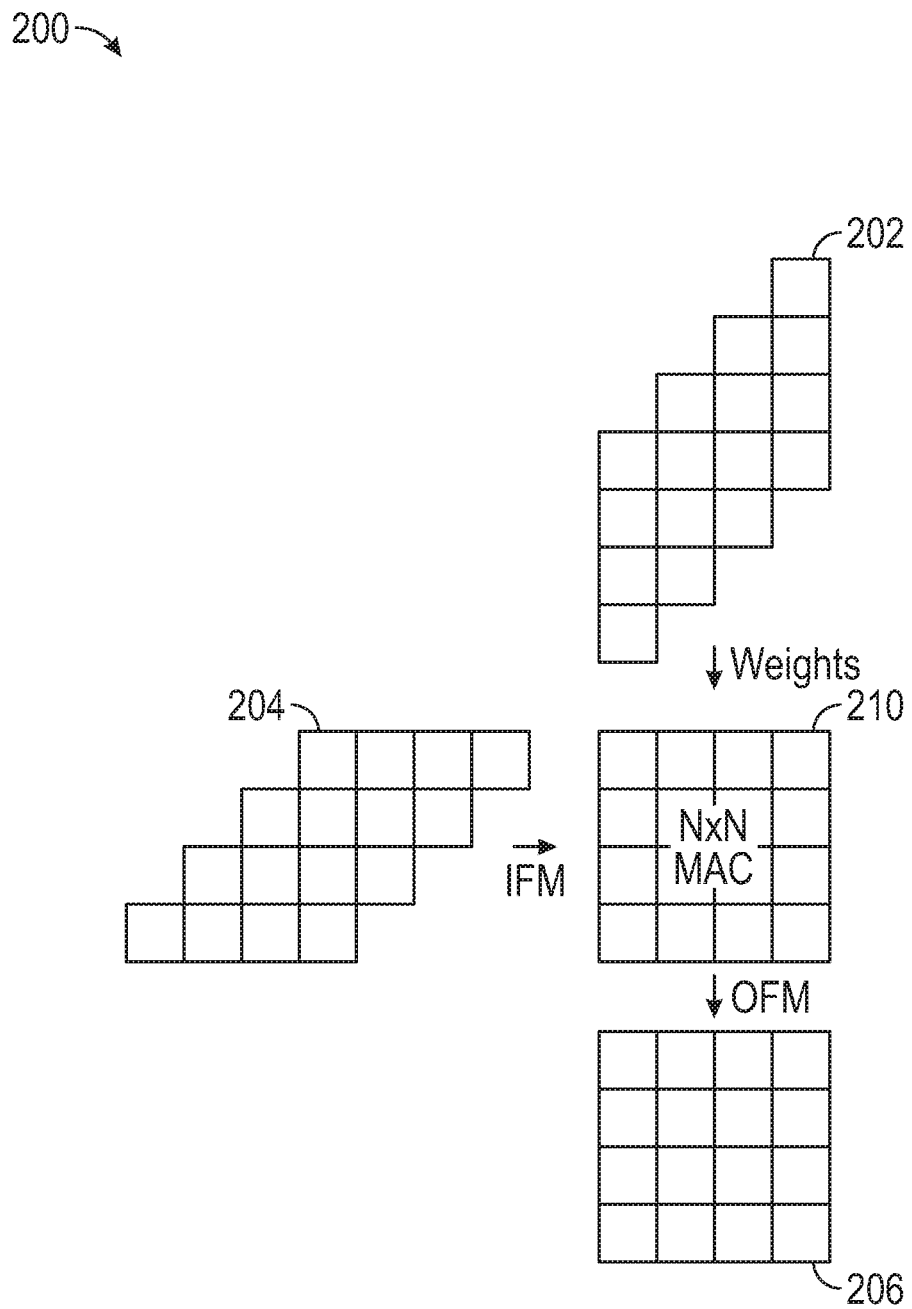
FIG. 2 illustrates an arrangement of a two-dimensional systolic MAC array.

FIG. 2 illustrates an arrangement of a two-dimensional (2D) systolic MAC array. A 2D systolic MAC array operates when performing matrix multiplication. There are various "dataflows" that describe how the operands move through the array. As shown in FIG. 2, the dataflow is an "output stationary" dataflow.

In FIG. 2, the input feature map (IFM) 204 enters the array 210, shown as an N×N MAC array, from the left, while the weights 202 enter from the top down. The data is typically staggered to align the elements of the matrices as they flow through the pipelined MAC array 210. As two operands reach an element of the array 210, they are multiplied together and added to the local accumulator.

This process is repeated for all the IFMs (204)/weights (202), and when complete, the accumulator values are read out of the local registers in each element of the array 210. While FIG. 2 is described in terms of CNNs, this technique may be generalized to generic matrix multiplication.

In CNNs and many other matrix multiplication embodiments, there may be a large number of zero operands.

During inference, a new image (in the case of image recognition) is presented to the network, which classifies into the training categories by computing each of the layers in the network, in succession. The intermediate data between the layers are called activations, and the output activations of one layer becomes the input activations of the next layer.

Sparsity in a CNN layer can be considered as the fraction of zeros in the layer's weight and input activation matrices. One technique for creating weight sparsity is to prune the network during training. Such a pruning algorithm can operate in two phases.

First, any weight with an absolute value that is close to zero (e.g. below a defined threshold) is set to zero. This process has the effect of removing weights from the filters, sometimes even forcing an output activation to always be zero. Second, the remaining network is retrained, to regain the accuracy lost through pruning. The result of pruning is a smaller network with accuracy extremely close to the original network. The process can be iteratively repeated to reduce network size while maintaining accuracy.

In some available CNNs, the number of zero operands in the data is in the range 50%-70% (e.g., AlexNet®, GoogLeNet® and VGGNet®, for example). The number of operations required (i.e., with both non-zero operands) can be as low as 10% in some layers. This is a very compelling result that suggests that exploiting this sparsity property, would achieve much lower power, or higher throughput, or both.

However, efforts to exploit sparsity have typically relied on indexed (addressed) data movement. Since CNN inference is typically using 8-bit integers, it may be challenging to achieve a benefit from sparsity, since the index typically requires at least 4-bits on top of the 8-bit data. In addition, large cross-bars may be necessary to direct the products to the correct location in the output feature map.

An embodiment of this disclosure is a hardware accelerator optimized to exploit operand sparsity. Instead of moving to indexed-data representation, which is not efficient for small word sizes, the approach does not require an index for each item of data. It also leverages a 2D systolic array, which achieves very high data reuse. Starting with a 2D MAC array, a 1-bit signal is added to each 8-bit data item, which indicates if the data item is non-zero (NZ). This NZ bit is then used to clock gate the 8-bit data registers when it is low. Each MAC element can also be clock gated when both of the NZ bits for the two operands are not high.

Adding NZ bits and clock gating reduces the power consumption. However, it results in low hardware utilization, and it also does not optimize speedup. To combat this, this disclosure describes exposing more operands to each 2D array (MAC element), to increase the utilization and the throughput.

Figure 3A:
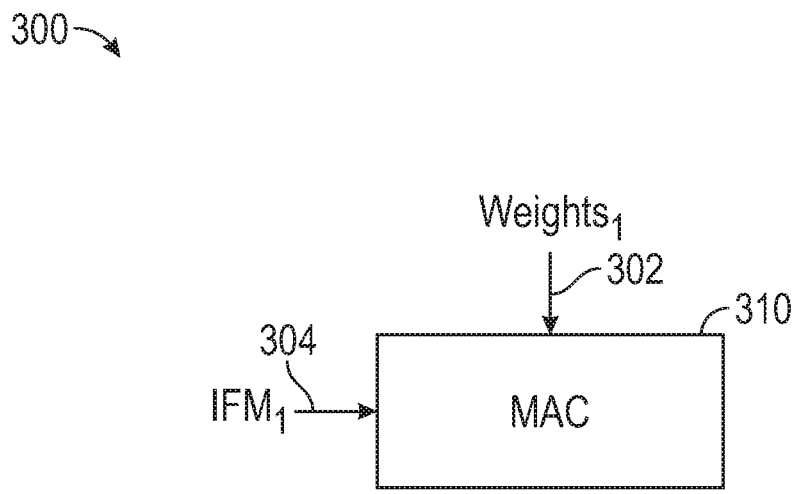
FIGS. 3A and 3B illustrate a single MAC array and accumulator register, respectively.
Figure 3B:
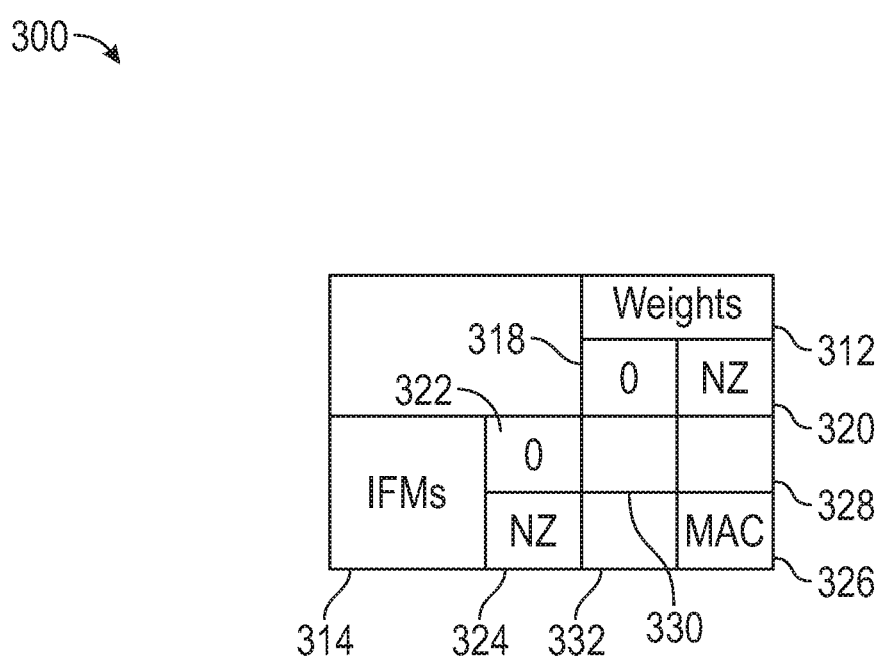

This is shown in FIGS. 3A and 3B, as a baseline case 300 of a single 2D array, for example a MAC array element, 310 that contains a single array datapath (FIG. 3A) and an accumulator register (FIG. 3B).

FIG. 3A shows input feature map (IFM) data 304 and weight input data 302 are provided to a two-dimensional array 310.

FIG. 3B shows a table of IFMs (input feature maps) input 314 with "0" section 322 and NZ section 324. Weights 312 also have a "0" section 318 and an NZ section 320. The use of the IFM "0" section 322 and the weight "0" section 318 and IFM NZ section and weight NZ section 320 form sections 326, 328, 330 and 332.

As shown in FIG. 3B, for typical i.i.d. 50% operand sparsity, the 2D array, e.g., MAC, utilization is at 25%, since only section 326 shows a 2D array utilization. Sections 328, 330 and 332 are empty.

Thus, FIGS. 3A and 3B show a single MAC element 310 of a (conventional) 2D array, similar to the Google® TPU. After adding the NZ bits, and assuming 50% NZ in both matrices (IFM and weight), the MAC utilization is 25% at 1 MAC/cycle/element. This is because it is only necessary to do a MAC operation if both operands (320 (weight operand) and 324 (IFM operand)) are NZ.

Figures 4A, 4B:
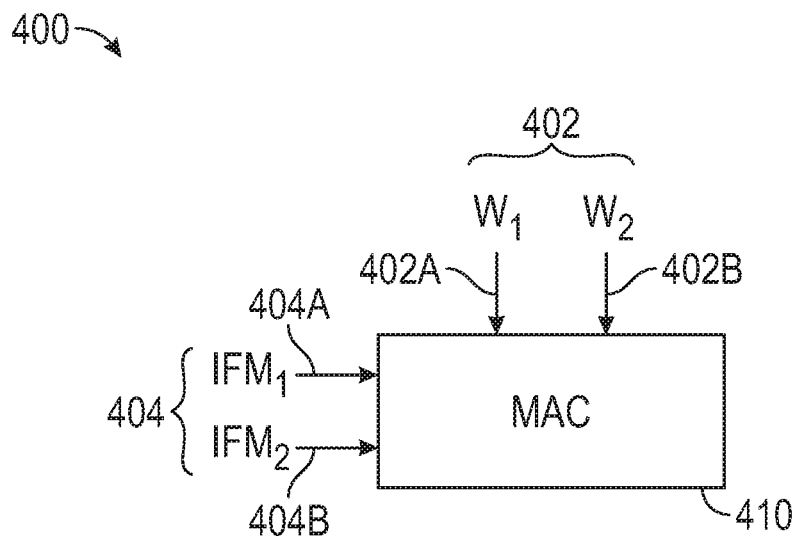
FIGS. 4A and 4B illustrate a single MAC array and accumulator register, respectively, that exposes more operands to each MAC element.

FIGS. 4A and 4B show that by doubling the number of operands it is possible expose to each element so that a single hardware 2D array, e.g., a MAC array, processes two pairs of operands at each element, instead of one pair.

FIG. 4A shows input feature map (IFM) data 404 and weight input 402 are provided to a two-dimensional array 410.

FIG. 4A shows that IFM input data includes two inputs 404(a) and 404(b). While two inputs 404(a) and 404(b) are shown, any suitable number of inputs of IFM could be used. Weight input data includes two inputs 402(a) and 402(b). While two inputs 402(a) and 402(b) are shown, any suitable number of weight inputs of could be used. The IFM inputs 404 and weight inputs 402 are in a single cycle.

FIG. 4B shows the combinations of zero and NZ operands, and that the utilization of the single 2D array, such as a MAC array, has increased to 50%. The throughput of 2 MAC/cycle/element shows an increase with very similar hardware cost (i.e., only a single real hardware MAC unit).

Indeed, FIG. 4B shows a table of IFMs (input feature maps) input 414 with "0" and NZ permutation section 428 and NZ section 324. Weights 412 also have a "0" and NZ permutation section 418. The use of the IFM "0" and NZ permutation section 428 and the weight "0" and NZ permutation section 418 form section 430 with sections for each combination of IFM inputs 428 and weight inputs 418.

FIG. 4B shows that exposing more operands to each MAC element, results in an increase the hardware utilization from 25% to 50% and increase the average throughput up to 2 MAC/cycle/element. Thus, as shown in FIG. 4B, eight of the sixteen sections of 430 are an array operation.

It is also an embodiment of this disclosure that two 2D arrays, or 2 MACs could be used in a single cycle with the hardware MAC unit. This is shown in the lower-right corner of 430 in FIG. 4B.

One embodiment of this is to stall the inputs to generate a global stall signal for the other elements in the array and the input data, to allow the element to take 2 cycles to do the 2 MACs.

An alternative to the global stall signal would be to use skid-buffers internally to temporarily store the incoming operands in the 2nd cycle of a 2 MAC operation.

Embodiments of this disclosure scale well for even larger numbers of operands. Also, the embodiments described herein can utilize for wire sharing. The utilization of the connecting wires is low (e.g., 50%), and therefore it's possible to multiplex the NZ data through a smaller set of wires, which reduces hardware cost.

Figure 5A:
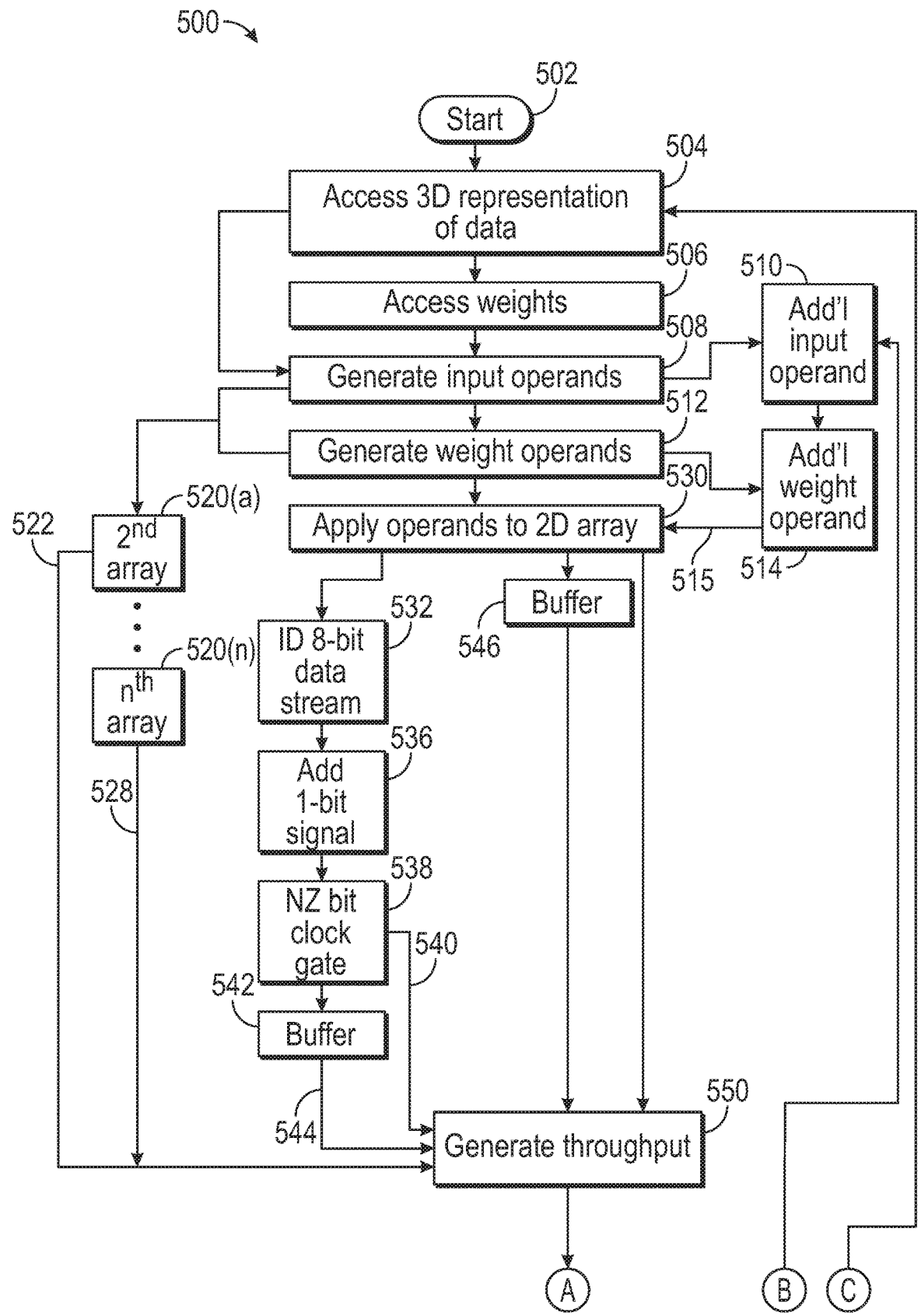
FIGS. 5A and 5B illustrates a flowchart according to an embodiment.
Figure 5B:
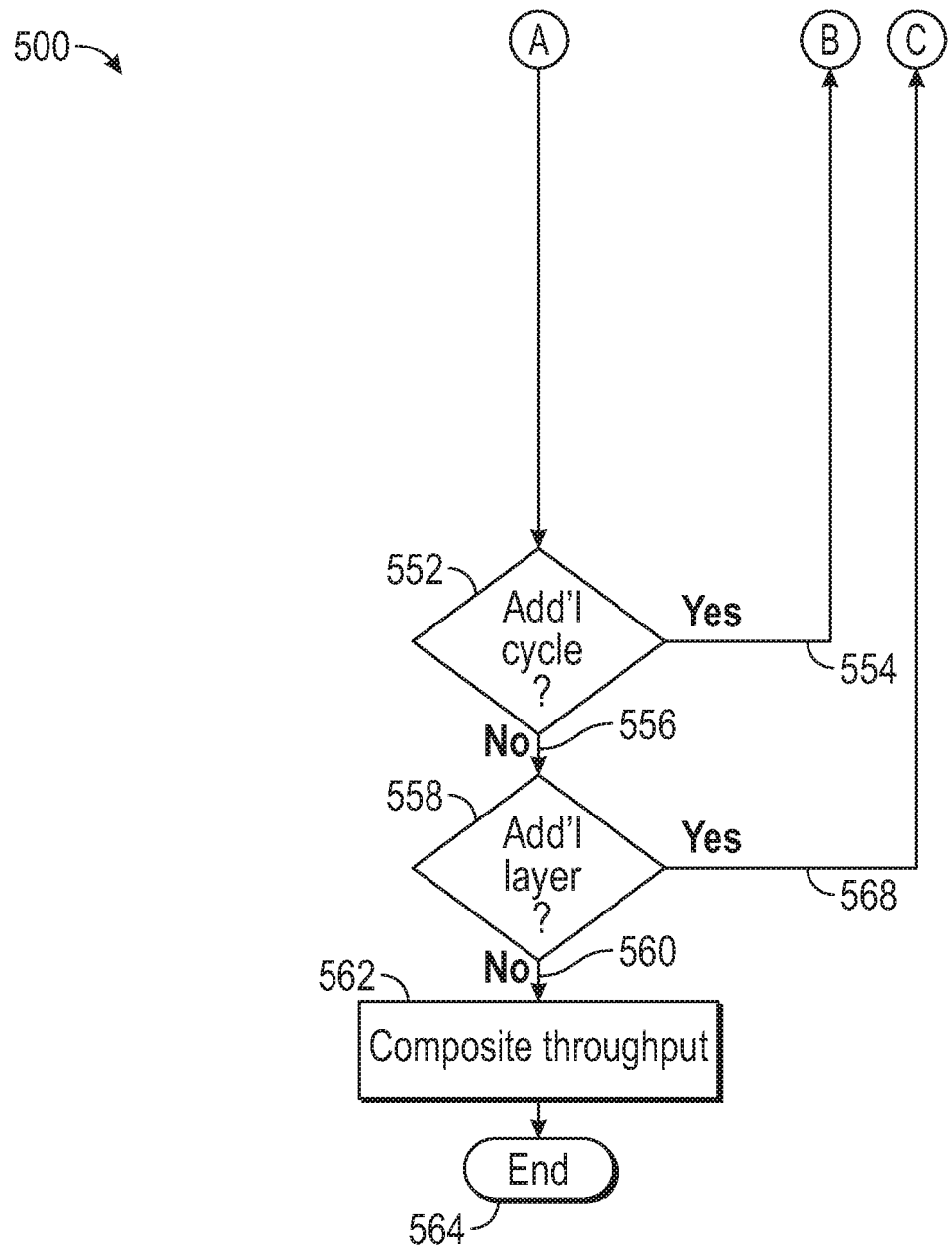

FIGS. 5A and 5B show a flowchart 500 according to an embodiment. The algorithm 500 begins (502).

A three-dimensional input data representation is accessed (504). This three-dimensional data representation may be image, audio, a combination of image and audio or any type of data that may be stored. The input may be an input feature map, as described herein.

Weights are identified (506). These weights correspond to the input data from the 3D representation of input data, and were described in relation to FIG. 1 as element 102 and weights for each layer 103 (a) . . . (n), herein.

Input operands are generated (508). These input operands are determined from the input data, described as IFM (input feature map) FIG. 1, element 104 with layers 105(a) . . . (n), herein.

Weight operands are generated (512). These weight operands are determined from the weight input data (506).

The input operands (508) and weight operands (512) are applied to an array (MAC array) (530). The operands (508, 521) include first and second input data and first and second weights.

Throughput is generated (550) by the 2D array based on the first set of operands.

Referring to the operands applied to the 2D array (530), additionally, and optionally, more 2D arrays 520(a) . . . (n) where "n" is any suitable number may be used. These 2D arrays may be MAC arrays and may operate in a single cycle or different cycles. These 2D arrays are used to generate the throughput (550) as shown by lines 522 and 528.

Referring to the operands applied to the 2D array (530), additionally, and optionally, an identification may be made of 8 bit data items (532). A 1-bit signal is added to each 8 bit data item (536). Non zero (NZ) items are used to clock gate the 8 bit data registers when the register is low (538). The throughput (550) can be generated (540) after the adding NZ bits and clock gating as shown by line 540.

Additionally, and optionally, buffering (542) may be applied after the clock gating (538) and then the throughput is generated (550) as shown by line 544.

Referring to the operands applied to the 2D array (530), Additionally, and optionally, more sets of operands may be generated. These include more input operands that may be generated (510) and more weight operands may be generated (514). Typically, these operands will be paired as input operand and associated weight operand, as described herein. These additional operands (510, 514) may be used in conjunction with additional 2D arrays (520 (a) . . . (n)) or may be provided to a single 2D array (530), as shown by line 515. These additional operands (510, 514) may be used in a single cycle or used in a different cycle.

Referring to the operands applied to the 2D array (530), additionally, and optionally, the inputs may be buffered, using a skid buffer (546). This buffering is optional and may be used to modify the timing of the inputs to the array.

Throughput is generated (540) by the 2D array. This throughput (540) is the result of the two operands of the input data (508) and the two operands of the weight input (510) received by the 2D array (520). The throughput (540) may also, optionally, be based on the additional operands (input and weight) (510, 514), additional array(s) (520(a) . . . (n)), clocking (532, 536, 538) and/or buffering (either 542 and/or 546). This throughput may be produced in a single cycle, or may also include processing from more than one cycle.

A determination is made whether there is another cycle (552). If so (554), additional inputs (data and weight) are accessed (510, 514) and these additional inputs are used in another cycle, as describe herein. The second cycle may use a single 2D array (530) or additional 2D arrays (520(a) . . . (n), where "n" is any suitable number).

If there are not any additional cycles (556), a determination is made whether there are any additional layer(s) (558). If so (568), then the 3D representation of input data is accessed (504) and the process proceeds.

If there are no more layer(s) (560), a composite throughput is generated (562). This composite throughput is the result of the throughput generated (550) and includes any additional cycle or layer processing.

The process ends (564).

The series of operations 500 (FIGS. 5A and 5B) may be stored on non-volatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following:

1. A method comprising: accessing a three-dimensional representation of input data; accessing a plurality of weights; generating a plurality of input operands based on the three-dimensional representation of input data; generating a plurality of weight operands based on the plurality of weights; accessing a two-dimensional array configured to receive, as input: a first input operand; and a first weight operand, the first weight operand being associated with the first input operand; and a second input operand; and a second weight operand, the second weight operand being associated with the second input operand, in a single cycle; and generating a throughput for the single cycle based on the received inputs.

2. The method as itemed in item 1, further comprising: adding a one-bit signal to each 8 bit data item of the input data; and using a non-zero bit to clock a gate at an 8 bit register.

3. The method as itemed in item 1, where the two-dimensional array performs a plurality of multiply-and-accumulate operations on the input operands and on the weight operands.

4. The method as itemed in item 1, where the two-dimensional array comprises a MAC array.

5. The method as itemed in item 1, further comprising accessing a second two-dimensional array that receives other input operands and other weight operands in the single cycle.

6. The method as itemed in item 5, further comprising: generating a throughput, based on the other input operands and other weight operands, in the single cycle.

7. The method as itemed in item 6, where the second two-dimensional array comprises a MAC array.

8. The method as itemed in item 1, further comprising: accessing a second two-dimensional array configured to receive, as input: a third input operand; and a third weight operand, the third weight operand being associated with the third input operand; and a fourth input operand; and a fourth weight operand, the fourth weight operand being associated with the fourth input operand, in a single cycle; and generating a throughput for the single cycle based on the received inputs at the second two-dimensional array.

9. The method as itemed in item 8 where the second two-dimensional array comprises a MAC array.

10. The method as itemed in item 1, further comprising buffering the operands prior to providing the operands to the two-dimensional array.

11. The method as itemed in item 1, further comprising: identifying two or more non-zero data elements in the input data; and multiplexing at least apportion of non-zero data elements.

12. An apparatus comprising: a three-dimensional representation of input data adapted to provide a plurality of input operands; a weight module adapted to provide a plurality of weight operands; a two-dimensional array configured to receive, as input, in a single cycle: a first input operand; and a first weight operand, the first weight operand being associated with the first input operand; and a second input operand; and a second weight operand, the second weight operand being associated with the second input operand; and where the two-dimensional array is adapted to generate a throughput for the single cycle based on the received inputs.

13. The apparatus as itemed in item 12, where the two-dimensional array is adapted to: add a one-bit signal to each 8 bit data item of the input data; and use a non-zero bit to clock a gate at an 8 bit register.

14. The apparatus as itemed in item 12, where the two-dimensional array performs a plurality of multiply-and-accumulate operations on the input operands and on the weight operands.

15. The apparatus as itemed in item 12, where the two-dimensional array comprises a MAC array.

16. The apparatus as itemed in item 12, further comprising a second two-dimensional array that receives other input operands and other weight operands in the single cycle.

17. The apparatus as itemed in item 16, where the second two-dimensional array is adapted to generate a throughput, based on the other input operands and other weight operands, in the single cycle.

18. The apparatus as itemed in item 16, where the second two-dimensional array comprises a MAC array.

19. The apparatus as itemed in item 12, further comprising: a second two-dimensional array configured to receive, as input, in the single cycle: a third input operand; and a third weight operand, the third weight operand being associated with the third input operand; and a fourth input operand; and a fourth weight operand, the fourth weight operand being associated with the fourth input operand; and where the second two-dimensional array generates a throughput for the single cycle based on the received inputs at the second two-dimensional array.

20. The apparatus as itemed in item 19 where the second two-dimensional array comprises a MAC array.

21. The method as itemed in item 12, further comprising a buffer adapted to buffer the operands prior to providing the operands to the two-dimensional array.

22. A system comprising: a memory; and a processor, coupled to the memory, adapted to execute instructions stored in the memory, the instructions comprising: access a three-dimensional representation of input data; access a plurality of weights; generate a plurality of input operands based on the three-dimensional representation of input data; generate a plurality of weight operands based on the plurality of weights; access a two-dimensional array configured to receive, as input, in a single cycle: a first input operand; and a first weight operand, the first weight operand being associated with the first input operand; and a second input operand; and a second weight operand, the second weight operand being associated with the second input operand; and generate a throughput for the single cycle based on the received inputs.

23. The system as itemed in item 22, where the instructions further comprise: access a second two-dimensional array configured to receive, as input, in the single cycle: a third input operand; and a third weight operand, the third weight operand being associated with the third input operand; and a fourth input operand; and a fourth weight operand, the fourth weight operand being associated with the fourth input operand; and generate a throughput for the single cycle based on the received inputs at the second two-dimensional array.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed:

1. A method comprising:
   accessing a representation of input data;
   accessing a plurality of weights;
   generating a plurality of input operands based on the representation of input data;
   generating a plurality of weight operands based on the plurality of weights;
   accessing a two-dimensional array configured to receive, as input:
      a first input operand; and
      a first weight operand, the first weight operand being associated with the first input operand; and
      a second input operand; and
      a second weight operand, the second weight operand being associated with the second input operand;
   identifying one or more data items of at least one of the input data and the weights;
   adding a signal to at least one data item, the signal indicating whether the data item is not zero;
   clock gating a register in response to the signal indicating the data item is zero; and
   generating a first output based on the received inputs.

2. The method as claimed in claim 1,
   the signal being a one-bit signal, the at least one data item being an at least one 8-bit data item, and
   the register being an 8-bit register.

3. The method as claimed in claim 1, where the two-dimensional array performs a plurality of multiply-and-accumulate operations on the input operands and on the weight operands.

4. The method as claimed in claim 1, where the two-dimensional array comprises a MAC array.

5. The method as claimed in claim 1, further comprising:
   accessing the two-dimensional array in a single cycle; and
   accessing a second two-dimensional array that receives other input operands and other weight operands in the single cycle.

6. The method as claimed in claim 5, further comprising:
   generating a second output, based on the other input operands and other weight operands, in the single cycle.

7. The method as claimed in claim 6, where the second two-dimensional array comprises a MAC array.

8. The method as claimed in claim 1, further comprising:
   accessing a second two-dimensional array configured to receive, as input:
      a third input operand; and
      a third weight operand, the third weight operand being associated with the third input operand; and
      a fourth input operand; and
      a fourth weight operand, the fourth weight operand being associated with the fourth input operand, in a single cycle; and
   generating a second output for the single cycle based on the received inputs at the second two-dimensional array.

9. The method as claimed in claim 8 where the second two-dimensional array comprises a MAC array.

10. The method as claimed in claim 1, further comprising buffering the operands prior to providing the operands to the two-dimensional array.

11. The method as claimed in claim 1, further comprising:
    identifying two or more non-zero data elements in the input data; and multiplexing at least a portion of the non-zero data elements.

12. The method as claimed in claim 1, the representation of input data being a three-dimensional representation.

13. An apparatus comprising:
representation of input data adapted to provide a plurality of input operands;
a weight module adapted to provide a plurality of weight operands; and
a two-dimensional array configured to receive, as input:
 a first input operand; and
 a first weight operand, the first weight operand being associated with the first input operand; and
 a second input operand; and
 a second weight operand, the second weight operand being associated with the second input operand;
the two-dimensional array further configured to:
 identify one or more data items of at least one of the input operands and the weight operands;
 add a signal to at least one data item of the input, the signal indicating whether the data item is not zero;
 clock gate a register in response to the signal indicating the data item is zero; and
 generate a first output based on the received inputs.

14. The apparatus as claimed in claim 13,
the signal being a one-bit signal, the at least one data item being an at least one 8-bit data item, and
the register being an 8-bit register.

15. The apparatus as claimed in claim 13, where the two-dimensional array performs a plurality of multiply-and-accumulate operations on the input operands and on the weight operands.

16. The apparatus as claimed in claim 13, where the two-dimensional array comprises a MAC array.

17. The apparatus as claimed in claim 13, further comprising:
the two-dimensional array configured to receive input operands and weight operands in a single cycle; and
a second two-dimensional array that receives other input operands and other weight operands in the single cycle.

18. The apparatus as claimed in claim 17, where the second two-dimensional array is adapted to generate a second output, based on the other input operands and other weight operands, in the single cycle.

19. The apparatus as claimed in claim 17, where the second two-dimensional array comprises a MAC array.

20. The apparatus as claimed in claim 13, further comprising:
a second two-dimensional array configured to receive, as input,
 a third input operand; and
 a third weight operand, the third weight operand being associated with the third input operand; and
 a fourth input operand; and
 a fourth weight operand, the fourth weight operand being associated with the fourth input operand; and
where the second two-dimensional array generates a second output based on the received inputs at the second two-dimensional array.

21. The apparatus as claimed in claim 20 where the second two-dimensional array comprises a MAC array.

22. The method as claimed in claim 13, further comprising a buffer adapted to buffer the operands prior to providing the operands to the two-dimensional array.

23. A system comprising:
a memory; and
a processor, coupled to the memory, adapted to execute instructions stored in the memory, the instructions comprising:
 access a representation of input data;
 access a plurality of weights;
 generate a plurality of input operands based on the representation of input data;
 generate a plurality of weight operands based on the plurality of weights;
 access a two-dimensional array configured to receive, as input:
  a first input operand; and
  a first weight operand, the first weight operand being associated with the first input operand; and
  a second input operand; and
  a second weight operand, the second weight operand being associated with the second input operand;
 identify one or more data items of at least one of the input operands and the weight operands;
 add a signal to at least one data item, the signal indicating whether the data item is not zero;
 clock gate a register in response to the signal indicating the data item is zero; and
 generate an output based on the received inputs.

24. The system as claimed in claim 23, where the instructions further comprise:
access a second two-dimensional array configured to receive, as input:
 a third input operand; and
 a third weight operand, the third weight operand being associated with the third input operand; and
 a fourth input operand; and
 a fourth weight operand, the fourth weight operand being associated with the fourth input operand; and
generate a second output based on the received inputs at the second two-dimensional array.

25. The system as claimed in claim 23, the signal being a one-bit signal, the at least one data item being an at least one 8-bit data item, and the register being an 8-bit register.

26. The system as claimed in claim 23, further comprising:
the two-dimensional array configured to receive input operands and weight operands in a single cycle; and
a second two-dimensional array that receives other input operands and other weight operands in the single cycle.

* * * * *